United States Patent
Calla et al.

(10) Patent No.: US 12,534,809 B2
(45) Date of Patent: Jan. 27, 2026

(54) COATING COMPOSITION, COATED TURBINE COMPONENT, AND METHOD OF APPLYING THE COATING

(71) Applicant: General Electric Company, Schenectady, NY (US)

(72) Inventors: Eklavya Calla, Bangalore (IN); Biju Dasan, Bangalore (IN); Ritwik Biswas, Bangalore (IN); Maxim Konter, Klingnau (CH)

(73) Assignee: General Electric Company, Schenectady, NY (US)

(*) Notice: Subject to any disclaimer, the term of this patent is extended or adjusted under 35 U.S.C. 154(b) by 595 days.

(21) Appl. No.: 17/987,101

(22) Filed: Nov. 15, 2022

(65) Prior Publication Data

US 2024/0158921 A1   May 16, 2024

(51) Int. Cl.
*C23C 24/04* (2006.01)

(52) U.S. Cl.
CPC .................................. *C23C 24/04* (2013.01)

(58) Field of Classification Search
None
See application file for complete search history.

(56) References Cited

U.S. PATENT DOCUMENTS

| | | |
|---|---|---|
| 8,974,588 B2 | 3/2015 | Lau et al. |
| 10,315,218 B2 | 6/2019 | Mahalingam et al. |
| 10,823,199 B2 | 11/2020 | Jones |
| 2010/0247321 A1 | 9/2010 | Kulkarni et al. |
| 2014/0166473 A1 | 6/2014 | Lipkin et al. |
| 2016/0108509 A1 | 4/2016 | Anand et al. |
| 2016/0115797 A1 | 4/2016 | Calla et al. |
| 2017/0175570 A1 | 6/2017 | Calla et al. |
| 2017/0253821 A1 | 9/2017 | Montagne et al. |
| 2020/0115044 A1 | 4/2020 | Huber et al. |

FOREIGN PATENT DOCUMENTS

| | | | |
|---|---|---|---|
| CN | 104862695 A | * 8/2015 | |
| CN | 106676458 A | 5/2017 | |
| CN | 109135363 A | * 1/2019 | ............... C09D 5/10 |
| DE | 102010037691 A1 | 3/2012 | |
| EP | 2088225 B1 | 12/2008 | |

(Continued)

OTHER PUBLICATIONS

Liu et al, CN 104862695 A, English Translation from FIT (Year: 2015).*

(Continued)

*Primary Examiner* — Colin W. Slifka
(74) *Attorney, Agent, or Firm* — James Pemrick; Charlotte Wilson; Hoffman Warnick LLC

(57) ABSTRACT

A composition includes aluminum (Al), and a blend of a carbide and nickel-chromium (Ni-20Cr). The method of applying a coating composition includes blending a carbide and nickel-chromium (Ni-20Cr) with aluminum (Al) to form a composition, the carbide and the nickel-chromium (Ni-20Cr) in a range between 90% and about 99.5% by weight of the composition, and wherein the aluminum (Al) is in a range between about 0.5% and less than about 10% by weight of the composition; and spraying the composition on the turbine component.

19 Claims, 1 Drawing Sheet

(56) References Cited

FOREIGN PATENT DOCUMENTS

| | | |
|---|---|---|
| EP | 2226409 A2 | 9/2010 |
| EP | 2778250 A2 | 9/2014 |
| EP | 3081757 B1 | 6/2020 |
| FR | 2982187 A1 | 5/2013 |
| JP | 2009041059 A | 2/2009 |

OTHER PUBLICATIONS

Su, CN 109135363, English Translation from FIT (Year: 2019).*
Maekai, I.A., et al.; "Resistance to flurry erosion by WC-10Co-4Cr and Cr3C2-25 (Ni20Cr) coating deposited by HVOF stainless steel F6NM"; International Journal of Refractory Metals and Hard Materials; vol. 105; Jun. 2022; 105830; pp. 1-9; p. 6 and Figure 12.
International Search Report and Written Opinion dated Sep. 6, 2024 for PCT/US2023/079310 filed Nov. 10, 2023; pp. 9.
International Preliminary Report on Patentability mailed Apr. 29, 2025 for Application PCT/US2023/079310 filed Nov. 10, 2023; pp. 6.

* cited by examiner

COATING COMPOSITION, COATED TURBINE COMPONENT, AND METHOD OF APPLYING THE COATING

TECHNICAL FIELD

The disclosure relates generally to a coated article and a method for applying a coating. More specifically, the disclosure is directed to a degradation protected coated article and method for applying the degradation protective coating to an article.

BACKGROUND

Turbomachine components, including compressors, such as but not limited to an axial compressor, a centrifugal compressor, and a rotary compressor, may often be concerned with a reduction in working efficiency due to corrosion of the turbine blades used in the compressor system. Further, turbomachines include turbines that are formed with stages of turbine blades, including rotor and stator blades. Efficiency of a turbine may drop as the blades become corroded or fouled over time. The blades may tend to collect deposits, such as iron oxide particulates and other oxide debris from the gases and fluids at rear stages of the turbine. Deterioration of blade surfaces due to fluids and gases during operation, and/or reactions with particulate deposits may be rapid. In addition, down-time conditions in a compressor may result in possible moisture condensation in a corrosive environment to further enhance the deterioration of the blade surface.

Surface damage may not be easily removed by water wash because the deposits may not be water soluble. On-line water wash, fogging, and evaporative cooler systems have been employed in attempts to improve the performance of turbomachine components, including compressors of large industrial gas turbines, such as large industrial gas turbines used by utilities to generate electricity. These systems generally include introducing water droplets at the compressor inlet, with the result that the blades of the first stage of the compressor are impacted by water droplets at high velocities. Compressor blades formed of iron-based alloys, including series 400 stainless steels, are prone to water droplet erosion at their leading edges, including their roots where the blade airfoil attaches to the blade platform. The blades are also susceptible to corrosion pitting along the leading-edge surfaces of the blades resulting from a build-up of fouling particles that cause galvanic attack. Corrosion is exacerbated if the turbine operates in or near a corrosive environment, such as near a chemical or petroleum plant or near a body of saltwater. Deterioration of compressor blades is also exacerbated when exhaust gas re-circulation (EGR) is employed to increase the exhaust $CO_2$ concentration as it easier to decarbonize flue gas that has higher $CO_2$ concentration. EGR results in acidic conditions in compressor that can lead to higher risk of corrosion and pitting.

Deterioration of turbomachine components may be reduced by protecting the blade surfaces using a number of coating techniques to coat turbomachine components. For instance, blade surfaces are known to be protected through pure coating on the blade. U.S. App. No. 2007/0261965 describes a composition and method to provide a coated object that has a high-temperature resistance. The coated object can be produced by electrodeposition of one or more metal or metal alloy layers on a substrate and thermal treating the coated substrate such that the layers and the substrate partially and/or completely interdiffuse.

It is believed that, due to the potential corrosive and erosive working environment for a turbine parts, application of a hard, oxidation resistant coating may be desirable. In addition, down-time conditions in a compressor may result in possible moisture condensation in a corrosive environment to further enhance the deterioration of the blade surface. Known solutions to the problem are discussed in U.S. Patent App. Pub. Nos. 2009/0297720 and 2011/0165433.

Furthermore, hot gas path components of gas turbines and aviation engines, particularly turbine blades, vanes, nozzles, seals, and stationary shrouds, operate at elevated temperatures, often in excess of 2,000° Fahrenheit (F).

Frequently, turbine or turbomachinery components, exposed to gas, air or steam flow, are provided with protective coatings to reduce wear, erosion, corrosion, and/or degradation during operation. For example, to reduce or eliminate erosion and abrasion of gas and steam turbine or turbomachinery components, particularly rear stage gas turbine compressor blades and vanes, an erosion-resistant or abrasion-resistant coating may be applied over the turbine or turbomachinery component. However, an erosion-resistant or abrasion-resistant coating may not provide protection against corrosion of the turbine or turbomachinery component.

BRIEF DESCRIPTION

All aspects, examples and features mentioned below can be combined in any technically possible way.

An aspect of the disclosure provides a composition comprising: aluminum (Al); and a blend of a carbide and nickel-chromium (Ni-20Cr).

Another aspect of the disclosure includes any of the preceding aspects, and wherein the carbide includes carbon and chromium (Cr—C).

Another aspect of the disclosure includes any of the preceding aspects, and wherein the carbide includes at least one of tungsten carbide (W—C), molybdenum carbide (Mo—C), titanium carbide (Ti—C), chromium carbide (Cr—C), silicon carbide (Si—C), aluminum carbide ($Al_4C_3$), and combinations thereof.

Another aspect of the disclosure includes any of the preceding aspects, and wherein the blend of the carbide and the nickel-chromium (Ni-20Cr) can include, by weight, 75% chromium carbide (Cr—C) and 25% nickel-chromium (Ni-20Cr).

Another aspect of the disclosure includes any of the preceding aspects, and wherein the overall weight of the blend of the carbide and the nickel-chromium (Ni-20Cr) is in a range between 90% and about 99.5%, by weight of the composition.

Another aspect of the disclosure includes any of the preceding aspects, and, wherein the aluminum (Al) is in a range between about 0.5% and less than 10% by weight of the composition.

Another aspect of the disclosure includes any of the preceding aspects, and, wherein the aluminum (Al) is in a range between about 5% and about 11% by weight of the composition.

Another aspect of the disclosure includes any of the preceding aspects, and wherein the aluminum (Al) is in a range between about 6% and about 11% by weight of the composition.

Another aspect of the disclosure includes any of the preceding aspects, and, wherein the aluminum (Al) is in a range between about 7% and about 11% by weight of the composition.

Another aspect of the disclosure includes any of the preceding aspects, and 1, wherein the aluminum (Al) is in a range between about 8% and about 11% by weight of the composition.

Another aspect of the disclosure includes any of the preceding aspects, and wherein the aluminum (Al) is in a range between about 8.5% and about 9.5% by weight of the composition.

Another aspect of the disclosure includes any of the preceding aspects, and, wherein the aluminum (Al) is about 9% by weight of the composition.

An aspect of the disclosure provides a coated turbomachine component; the coated turbomachine component comprising a turbomachine component; and a coating including a blend of a carbide and nickel-chromium (Ni-20Cr); and aluminum (Al).

Another aspect of the disclosure includes any of the preceding aspects, and wherein the carbide includes carbon and chromium (Cr—C).

Another aspect of the disclosure includes any of the preceding aspects, and, wherein the carbide includes at least one of tungsten carbide (W—C), molybdenum carbide (Mo—C), titanium carbide (Ti—C), chromium carbide (Cr—C), silicon carbide (Si—C), and combinations thereof.

Another aspect of the disclosure includes any of the preceding aspects, and, wherein the blend of the carbide and the nickel-chromium (Ni-20Cr) can include, by weight, 75% chromium carbide (Cr—C) and 25% nickel-chromium (Ni-20Cr).

Another aspect of the disclosure includes any of the preceding aspects, and wherein the overall weight of the blend of the carbide and the nickel-chromium (Ni-20Cr) is in a range between 90% and about 99.5%, by weight of the composition.

Another aspect of the disclosure includes any of the preceding aspects, and wherein the aluminum (Al) is in a range between about 0.5% and less than 10% by weight of the composition.

Another aspect of the disclosure includes any of the preceding aspects, and wherein the aluminum (Al) is about 9% by weight of the composition.

An aspect of the disclosure provides a method of applying a coating to a turbine component, the method comprising blending a carbide and nickel-chromium (Ni-20Cr) with aluminum (Al) to form a blend, the blend including the carbide and the nickel-chromium (Ni-20Cr) is in a range between 90% and about 99.5%, by weight of the blend, and the balance aluminum (Al); and spraying the blend on the turbine component.

Another aspect of the disclosure includes any of the preceding aspects, and wherein the spraying includes spraying by at least one of physical vapor deposition (PVD), high velocity oxygen fuel (HVOF), high velocity air-fuel (HVAF), air plasma spray (APS), vacuum plasma spray (VPS), and cold spray.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 2:
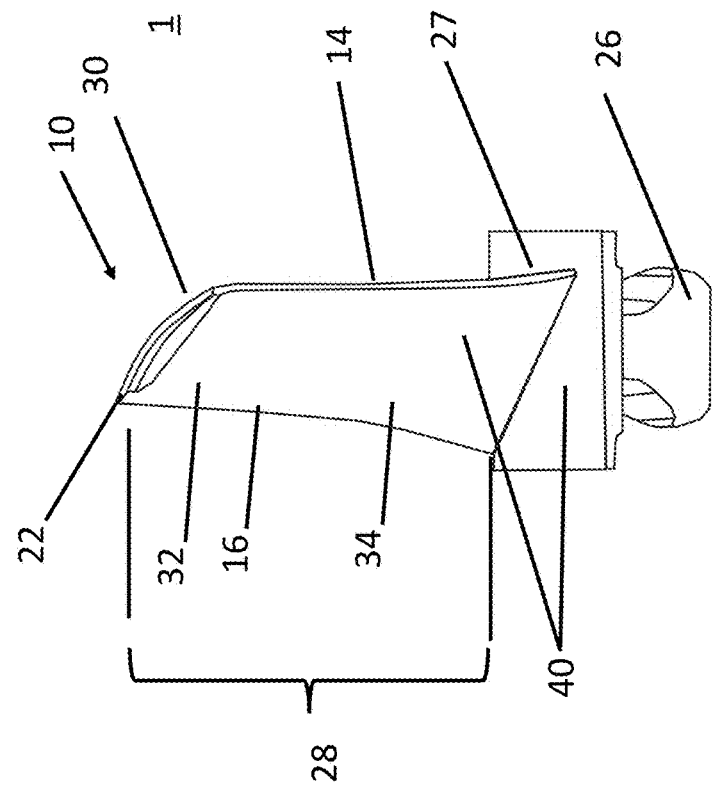
FIG. 2 is a perspective view of another coated article, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant compositions for machine components within turbomachinery. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, as described below. The terms "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs, or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Aspects of the embodiments include a coated article and a method for applying a coating. Embodiments of the present disclosure, in comparison to methods and articles not using one or more of the features disclosed herein, decrease component corrosion; increase galvanic compatibility; maintain or substantially maintain wear-resistance of a coating; increase efficiency; increase an amount of time between inspection; increase operational lifetime; decrease maintenance costs; provide a single step corrosion and erosion protection coating process; permit wet compression in gas turbines; and combinations thereof.

Moreover, the disclosure relates to a coating composition for degradation protection on a coated article. Further, the disclosure relates to methods and systems for applying a degradation protection coating. The systems and methods can protect a metal object to reduce efficiency losses due to erosion and corrosion. More particularly, the disclosure relates to degradation protection coating systems and methods of protecting a turbomachine component for reducing efficiency losses due to erosion and corrosion. Additionally, the disclosure relates to degradation protection coating systems and methods to protect component coated surfaces from getting rough through oxidation and to maintain initial levels of fatigue properties throughout operation.

Blades and vanes, such as stainless-steel blades and vanes used in the compressors of land-based gas turbine engines (for example, for power generation), have shown susceptibility to erosion and corrosion pitting of their airfoil surfaces. The erosion and corrosion pittings are believed to be associated with various electrochemical dissolution processes from impingement of water droplets and chemicals present in droplets, intake air, and combinations thereof. Electrochemically induced corrosion and erosion occurring at the airfoil surfaces may result in cracking due to cyclic thermal and operating stresses experienced by turbomachine components. Water droplet exposure may also result from use of on-line water washing, fogging and evaporative cooling, or various combinations of these processes to enhance compressor efficiency.

Additionally, water droplet exposure may result from environments in which gas turbines operate. These environments may be highly corrosive environments, such as but not limited to, those environments near chemical or petrochemical plants where various chemical species may be found in gas turbine intake air, or those at or near ocean coastlines or other saltwater environments where various sea salts may be present in the gas turbine intake air, or combinations of the above, or in other applications where gas turbine intake air contains corrosive chemical species.

Embodiments of the disclosure relate to a coating for reducing degradation of compressor blades during operation. The coating for reducing degradation is achieved by using erosion- and corrosion-resistant systems blended with aluminum (Al). For example, as embodied by the disclosure, aluminum (Al) with a hard phase component in a blend of a carbide and nickel-chromium (Ni-20Cr) may protect turbomachinery surfaces from oxidation and may keep an initial level of fatigue properties over an operational lifetime of the component.

Figure 1:
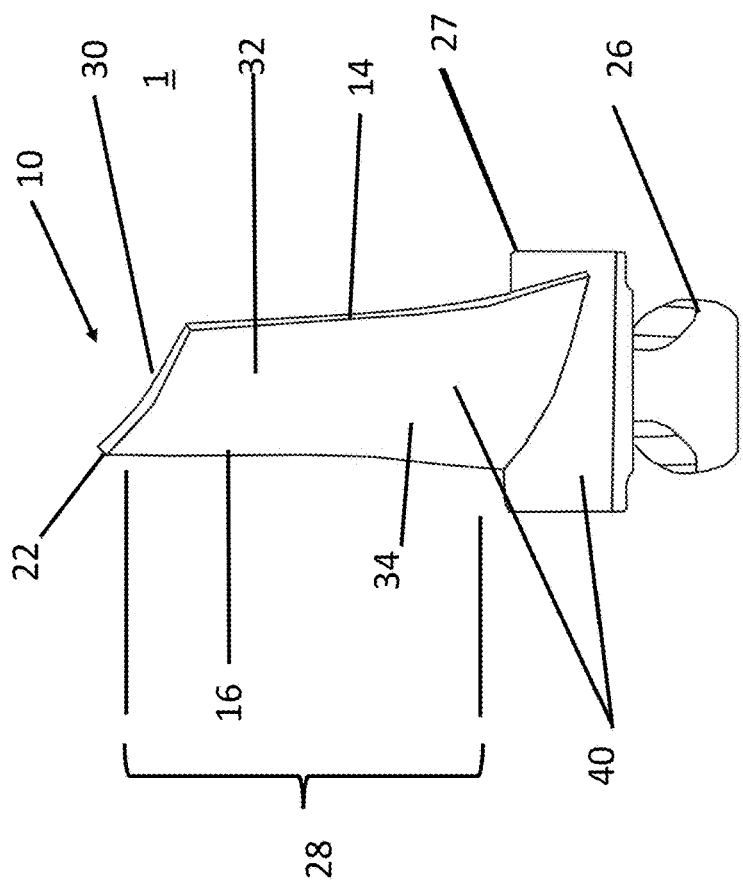
FIG. 1 is a perspective view of a coated article, according to embodiments of the disclosure.

FIGS. 1 and 2 illustrate turbomachinery components that are coated with a composition, as embodied by the disclosure. The coated article 1 may include, but is not limited to, a turbine component, a hot gas path component, a rotating component, or a combination thereof. For example, in one embodiment, coated article 1 may be a compressor blade. In another embodiment, coated article 1 may include a rear stage or last stage turbine blade. Other coated articles 1 may include a compressor vane, a centrifugal pump impeller, a pipeline, or a combination thereof.

Referring to FIGS. 1 and 2, coated article 1 includes an airfoil 10 having a leading edge 14, a trailing edge 16, a tip edge 22, and a blade root 26. A span 28 of airfoil 10 extends from tip edge 22 to blade root 26. A platform 27 is disposed between blade root 26 and airfoil 10. The surface of airfoil 10 within span 28 constitutes an airfoil surface 32 of blade 1 and is exposed to the flow path of intake air entering a gas turbine system. FIGS. 1 and 2 illustrate airfoil surface 32 of airfoil 10 including convex and concave surfaces 30 and 34, respectively, that extend between leading edge 14 and trailing edge 16.

Coating composition, as embodied by the disclosure, can be applied as a coating 40 to the airfoil 10 and platform 27. Coating 40 can be applied by an appropriate spray process and system, as described herein. As embodied by the disclosure, the coating composition includes a blend of a carbide and nickel-chromium (Ni-20Cr); and aluminum (Al). In certain aspects of the embodiments, the carbide includes chromium carbide (Cr—C).

As embodied by the disclosure, carbide can include a blend of carbon and chromium (Cr—C). However, other carbides are within the scope of the embodiments, and include tungsten carbide (W—C), molybdenum carbide (Mo—C), titanium carbide (Ti—C), chromium carbide (Cr—C), silicon carbide (Si—C), and combinations thereof.

As embodied by one aspect of the disclosure, the blend of a carbide and nickel-chromium (Ni-20Cr) can include, by weight, 75% chromium carbide (Cr—C) and 25% nickel-chromium (Ni-20Cr). Chromium carbide (Cr—C) can be blended with nickel-chromium (Ni-20Cr) powder. The overall weight of the blend of a carbide and nickel-chromium (Ni-20Cr) is in a range between 90% and about 99.5% by weight of the composition with the balance aluminum (Al). Therefore, according to the disclosure, aluminum (Al) in the composition can be provided in a range between about 0.5% and less than 10% by weight.

In certain embodiments of the disclosure, aluminum (Al) can be provided in a range between about 5% and about 11%; in a range between about 6% and about 11%; in a range between about 7% and about 11%; in a range between about 8% and about 11%; in a range between about 8% and about 10%, in a range between about 8.5% and about 9.5%. Moreover, aluminum (Al) can be provided at about 9%. Further, in certain aspects of the disclosure the Ni-20Cr content in the blend can be in a range between about 25% and about 20%.

As a non-limiting illustration of a coating composition, as embodied by the disclosure, 1000 grams of the coating composition includes a blend of 91% by weight, or 910 grams of 75% chromium carbide (Cr—C) and 25% nickel-chromium (Ni-20Cr), with 9% by weight, or 90 grams, of aluminum (Al). Thus, 75% of the 910 grams of the carbide and nickel-chromium (Ni-20Cr) blend includes 682 grams of chromium carbide (Cr—C) (in other words 910×0.75=68.2% by weight) and 228 grams of nickel-chromium (Ni-20Cr) (in other words 910×0.25=22.8% by weight), with 90 grams (9% by weight) aluminum (Al).

The coating can be applied to the component, such as the turbomachine component, by a spray process and system.

The spray process and system, as embodied by the disclosure, can include, but is not limited to, physical vapor deposition (PVD), high velocity oxygen fuel (HVOF), high velocity air-fuel (HVAF), air plasma spray (APS), vacuum plasma spray (VPS), and cold spray with galvanically electro-negative elements.

The coating, as embodied by the disclosure, can improve galvanic compatibility and fatigue properties of the coated article without impacting the spray process and system's aerodynamic properties. Galvanic corrosion is a process by which materials in contact with oxides corrode. These properties include control of coverage, surface finish, and thickness.

The coating composition, as embodied by the disclosure, can also improve erosion performance and pitting resistance. Moreover, the blend of carbide and nickel-chromium (Ni-20Cr), and aluminum (Al) may also provide protection from high temperature oxidation due to aluminum (Al) in the coating. Further, the coating can be surface treated after being applied for improving fatigue resistance. For example, the surface treatment can include, but are not limited to shot peening and/or mild grit blasting, for improving fatigue resistance.

Chromium carbide particles in the composition can be typically 1-2 microns or finer. These chromium carbide particles can be agglomerated, sintered, and then crushed along with nickel-chromium (Ni-20Cr) feedstock to create powder blends of carbide and nickel-chromium (Ni-20Cr) in various size fractions between 10-105 microns.

These powders can then be applied by an appropriate spray process and system. According to certain aspects of the disclosure, a size fraction can be in a range between about 10 and about 38 microns for HVAF; in a range between about 15 and about 45 microns for HVOF; in a range between about 5 and about 38 microns for cold spray, and in a range between about 45 and about 105 microns for APS.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. As used herein, "about" and approximately" indicates +/−10% of the value, or if a range, of the values stated.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A composition comprising: a blend of a carbide and nickel chromium, wherein the overall weight of the blend of the carbide and the nickel-chromium is in a range between 90% and about 99.5% by weight of the composition; and aluminum,
wherein the carbide includes at least one of molybdenum carbide, titanium carbide, silicon carbide, aluminum carbide, and combinations thereof.

2. A composition according to claim 1, wherein the blend of the carbide and the nickel-chromium includes by weight, 25% nickel-chromium.

3. A composition according to claim 1, wherein the aluminum is in a range between about 0.5% and less than about 10% by weight of the composition.

4. A composition according to claim 1, wherein the aluminum is in range between about 5% and about 10% by weight of the composition.

5. A composition according to claim 1, wherein the aluminum is in a range between about 6% and about 10% by weight of the composition.

6. A composition according to claim 1, wherein the aluminum is in a range between about 7% and about 1011% by weight of the composition.

7. A composition according to claim 1, wherein the aluminum is in a range between about 8% and about 1011% by weight of the composition.

8. A composition according to claim 1, wherein the aluminum is in a range between about 8.5% and about 9.5% by weight of the composition.

9. A composition according to claim 1, wherein the aluminum is about 9% by weight of the composition.

10. A coated turbomachine component, comprising:
a turbomachine component; and
a coating including:
a blend of a carbide and nickel-chromium; and aluminum, in a range between about 5% and about 11% by weight of the composition,
wherein the carbide includes at least one of molybdenum carbide, titanium carbide, silicon carbide, aluminum carbide, and combinations thereof.

11. A coated turbomachine component according to claim 10, wherein the blend of the carbide and the nickel-chromium includes, by weight, 25% nickel-chromium.

12. A coated turbomachine component according to claim 10, wherein the overall weight of the blend of the carbide and the nickel-chromium is in a range between 90% and about 99.5% by weight of the composition.

13. A coated turbomachine component according to claim 10, wherein the aluminum (Al) is about 9% by weight of the composition.

14. A coated turbomachine component according to claim 10, wherein the aluminum is in a range between about 6% and about 11% by weight of the composition.

15. A coated turbomachine component according to claim 10, wherein the aluminum is in a range between about 7% and about 11% by weight of the composition.

16. A coated turbomachine component according to claim 10, wherein the aluminum is in a range between about 8% and about 11% by weight of the composition.

17. A coated turbomachine component according to claim 10, wherein the aluminum is in a range between about 8.5% and about 9.5% by weight of the composition.

18. A coated turbomachine component according to claim 10, wherein the aluminum is about 9% by weight of the composition.

19. A method of applying a coating to a turbomachine component, the method comprising:
blending a carbide and nickel-chromium with aluminum to form a composition, the carbide and the nickel-chromium in a range between 90% and about 99.5% by weight of the composition, and wherein the aluminum is in a range between about 0.5% and less than about 10% by weight of the composition; and
spraying the composition on the turbomachine component,
wherein the carbide includes at least one of molybdenum carbide, titanium carbide, silicon carbide, aluminum carbide, and combinations thereof.

* * * * *